United States Patent
Reinelt

(10) Patent No.: US 6,530,393 B2
(45) Date of Patent: Mar. 11, 2003

(54) FUEL TANK AND FUEL TANK FILLING ARRANGEMENT

(75) Inventor: Georg Reinelt, Bonn (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 0 days.

(21) Appl. No.: 09/941,273

(22) Filed: Aug. 28, 2001

(65) Prior Publication Data
US 2003/0019529 A1 Jan. 30, 2003

(30) Foreign Application Priority Data
Aug. 30, 2000 (DE) ......................... 100 42 529

(51) Int. Cl.⁷ ............... B65B 1/04; B65B 3/04; B67C 3/00
(52) U.S. Cl. ............... 137/256; 137/262; 137/592; 141/237; 141/286; 220/86.2
(58) Field of Search ............... 137/255, 256, 137/262, 592; 220/86.2; 141/236, 237, 286

(56) References Cited

U.S. PATENT DOCUMENTS

| | | | | |
|---|---|---|---|---|
| 1,882,154 A | * | 10/1932 | Mann et al. ............... 141/286 |
| 2,644,514 A | * | 7/1953 | Potter ..................... 220/86.2 |
| 3,071,287 A | * | 1/1963 | Gran ...................... 220/86.2 |
| 3,565,045 A | * | 2/1971 | Knox, Jr. et al. ........... 137/592 |
| 3,732,903 A | * | 5/1973 | Oates ..................... 141/237 |
| 3,906,984 A | * | 9/1975 | Rich et al. ................ 137/171 |
| 5,360,040 A | * | 11/1994 | Thorn et al. ............... 141/98 |
| 6,158,485 A | * | 12/2000 | Meyer et al. ............... 141/286 |
| 6,209,594 B1 | * | 4/2001 | Meyer et al. ............... 141/286 |
| 6,269,851 B2 | * | 8/2001 | Meyer et al. ............... 141/286 |
| 6,367,503 B1 | * | 4/2002 | Keller et al. .............. 137/574 |
| 6,460,562 B1 | * | 10/2002 | Hart ....................... 137/592 |

FOREIGN PATENT DOCUMENTS

| | | | |
|---|---|---|---|
| DE | 198 33 696 C 2 | 7/2000 | ......... B60K/15/03 |
| DE | 198 36 057 C 2 | 7/2000 | ......... B60K/15/04 |

* cited by examiner

Primary Examiner—John Rivell
(74) Attorney, Agent, or Firm—Grossman, Tucker, Perreault & Pfleger, PLLC

(57) ABSTRACT

A fuel tank for a motor vehicle has at least one reservoir which is arranged within the fuel tank, and a fuel pump associated with the reservoir. A filling conduit for filling the tank with fuel is of such a design that at least a partial flow of the fuel flowing through the filling conduit can be fed directly to the reservoir. The filling conduit opens at its delivery end into an open catch receptacle which communicates with the reservoir by way of at least one discharge.

10 Claims, 5 Drawing Sheets

FUEL TANK AND FUEL TANK FILLING ARRANGEMENT

FIELD OF THE INVENTION

The invention generally concerns a fuel tank and more particularly a fuel tank for a motor vehicle, and a filling arrangement for a fuel tank.

BACKGROUND OF THE INVENTION

The modern practice in relation to fuel tanks, more particularly for motor vehicles, is for the fuel pump in the fuel tank to be disposed in what is referred to as a surge or swirl pot, from which the fuel pump constantly delivers fuel to the engine of the motor vehicle. The swirl pot in turn is constantly filled with fuel from the main body of fuel in the fuel tank so that, with progressive consumption of the fuel in the tank, firstly the main fuel tank body in which the swirl pot is disposed is emptied and finally the swirl pot itself is drained.

When there is a sufficiently high level of fuel in the main fuel tank body, this will generally ensure that there is a correspondingly high filling level in the swirl pot which in most cases is arranged at the lowest point in the main fuel tank body. When however the main fuel tank body is filled with a comparatively small amount of fuel, for example when the tank is first filled or in the event of emergency filling of the tank, it is not readily possible to guarantee that the swirl pot is sufficiently filled with fuel. Filling arrangements can therefore be provided which make it possible for the swirl pot to be filled with fuel in a preferential manner or as a matter of priority, over filling of the main fuel tank body. Attention may be directed in that respect to DE 198 36 057 and various other publications, for example DE 198 33 696 A1. For example, to provide for priority filling of the swirl pot with fuel in that way, DE 198 33 696 A1 provides that the fuel which flows through the filler pipe of the fuel tank is passed directly into the swirl pot constituting a fuel reservoir disposed within the tank. In that way, at least upon emergency filling of the tank with fuel, it is possible to guarantee that the fuel is firstly preferentially and possibly completely delivered into the swirl pot, with any further added amount of fuel then being additionally passed into the main fuel tank body.

It was found however that, when filling a fuel tank by means of a pump gun, such a design configuration can give rise to disadvantages if only small amounts of fuel are introduced into the tank at a high filling speed, for example upon initial filling. When filling the tank with a pump gun, up to 60 liters of fuel per minute can be supplied to the main fuel tank body, depending on the design of the fuel pump gun so that under some circumstances such an arrangement results in the fuel foaming up and consequently splashing over or spilling out, so that in the ultimate analysis it is not possible to guarantee that the reservoir is completely filled.

The arrangement disclosed in DE 198 36 057 therefore provides a fuel tank comprising at least one reservoir disposed therewithin and with which at least one fuel pump is operatively associated. At least one filling duct is so designed that at least a partial flow of the fuel flowing in therethrough can be fed directly to the reservoir. Provided at the discharge end at the filling connection of the main fuel tank body is a respective distributor element which has a branch for the main fuel tank body and a branch for the swirl pot. The distributor element is in the form of a plurality of tubes which are arranged in bundles which are connected at the discharge end of the filling connection downstream of a check valve so that, for example due to the cross-section of the tubes, the volume flow of fuel to be introduced into the tank is distributed proportionally to the swirl pot and the main fuel tank body surrounding the swirl pot. When the tank is filled with a small amount of fuel, this arrangement is intended to ensure that all the fuel is fed to the swirl pot. This is achieved by virtue of the branch of the distributor element, which is operatively associated with and leads to the swirl pot, being arranged at a low position.

Such an arrangement admittedly avoids excessive foaming in the swirl pot, by virtue of the fact that the volume flow is divided and distributed. It is however not possible to ensure in every case that, when introducing small volume flows of fuel into the tank, a given amount of fuel is fed to the swirl pot as a priority. In particular, it is not possible to guarantee that as being the case when the vehicle is in an inclined position during the filling procedure. It is also not impossible for a back-up of fuel to occur in the tubes, when the reservoir is filled with fuel, in the tank-filling operation.

SUMMARY OF THE INVENTION

An object of the invention is to provide an improved fuel tank for a motor vehicle so designed as to ensure priority filling of a swirl pot reservoir within the tank irrespective of the filling amount per unit of time.

Another object of the present invention is to provide a fuel tank for a motor vehicle which guarantees adequate filling of a reservoir disposed within the main fuel tank body but also avoiding foaming of the fuel in the reservoir.

Still another object of the present invention is to provide a motor vehicle fuel tank having a reservoir for fuel within the main fuel tank body, so designed as to prevent back-up of fuel out of the reservoir.

Yet another object of the present invention is to provide a filling arrangement for a fuel tank which ensures improved filling of the main fuel tank body while also ensuring proper filling of a reservoir disposed therewithin.

In accordance with the principles of the present invention in the aspect relating to the fuel tank the foregoing and other objects are attained by a fuel tank, for example for a motor vehicle, comprising at least one reservoir arranged within the fuel tank and at least one fuel pump operatively associated with the reservoir to draw fuel therefrom. At least one filling conduit for filling the fuel tank is so designed that at least a partial flow of fuel flowing in therethrough can be fed directly to the reservoir. The delivery end of the filling conduit opens into an open catch pan or like receptacle communicating with the reservoir by way of at least one discharge.

The catch pan or receptacle can be for example a funnel-shaped or channel-shaped receptacle.

The term reservoir is used herein in relation to the invention to denote a container for containing a residual amount of fuel, as is also often referred to as a swirl pot or surge pot.

Further in accordance with the invention in the aspect relating to the filling arrangement the foregoing and other objects are attained by a filling arrangement for a fuel tank, for example a motor vehicle, comprising a main fuel tank body and at least one reservoir for accommodating a residual amount of fuel, disposed within the main fuel tank body. At least one fuel pump is operatively associated with the reservoir for drawing fuel therefrom. A filling conduit is so designed that at least a partial flow of fuel flowing into the tank through the filling conduit can be fed directly to the reservoir. At the discharge end the filling conduit opens into an open catch receptacle communicating with the reservoir by way of at least one discharge.

As will be apparent from the description hereinafter of a preferred embodiment of the invention, the design configurations according to the invention afford the advantage that there cannot be a back-up of fuel from the reservoir, for example out through the filling pipe of the tank. In addition, there is the advantage that the speed of filling the reservoir is in practice dependent on the filling speed in the filling operation, only when filling the fuel tank from a reserve can, with a very small amount of fuel, in other words, over a wide range of filling speeds, there is a decoupling effect as between filling of the reservoir and the tank-filling speed. That means that it is possible for example for even reservoirs of a very small fuel-accommodating volume to be reliably filled in such a way as to avoid fuel from foaming up out of the reservoir. The catch receptacle forms a volume buffer unit which permits the reservoir to be really uniformly filled with fuel, for example even if, when filling the fuel tank from a reserve can, when the fuel is introduced rapidly, the filling conduit or the actual filler pipe disposed upstream thereof is charged with fuel at such a rate as to constitute a torrent of fuel therein. In an arrangement which provides for proportional distribution of the volume flow of fuel to be introduced, to the reservoir constituting the swirl pot and to the main fuel tank body surrounding the reservoir, by suitable division of the cross-section of the filling conduit or the actual filler pipe, as discussed for example in relation to the arrangement to be found in DE 198 36 057, the volume flow of fuel fed to the reservoir is still linearly proportional to the total volume flow introduced into the tank. Accordingly, when filling the tank at a high filling speed, the reservoir still receives a comparatively high volume flow and thus a large amount of fuel, which can result in the fuel foaming up and spilling out in the reservoir. That is critical in particular when introducing small amounts of fuel into the tank, at a high filling speed.

With the design configuration of the fuel tank and the fuel tank filling arrangement in accordance with the invention, those problems can be reliably avoided for in that case a partial volume flow of fuel is taken from the total amount of fuel supplied in the tank-filling operation, only after the fuel actually issues from the filling conduit.

In accordance with a preferred feature of the fuel tank according to the invention the discharge of the catch receptacle or pan opens by way of a hose or tube into the reservoir, although it may be connected directly thereto. In both cases the internal cross-section of the discharge is smaller than the internal cross-section of the filling conduit. That finally provides for the desired decoupling effect between filling of the reservoir, and the volume flow which is introduced in total in the filling conduit in the tank-filling operation.

When filling the tank with high volume flows, for example in the range of 60 liters per minute, the fuel which can no longer be received by the discharge of the catch receptacle would overflow and issue freely into the tank, by virtue of the open nature of the catch receptacle. The volume flow of fuel which is fed to the reservoir would however be approximately constant within certain fluctuation tolerances.

Preferably, the catch receptacle is formed in one piece with the filling conduit.

In another preferred feature the discharge is arranged at the location of the catch receptacle, which is lowest in the position of installation of the tank.

The catch receptacle may have a fall in the direction of the discharge so that, even when a motor vehicle whose tank is to be filled with fuel is in an inclined position, for.example the reserve volume of fuel which is to be introduced into the fuel tank of the vehicle from an emergency or reserve can almost entirely passes into the reservoir within the fuel tank of the vehicle.

In the case of a tank structure of a branched and convoluted and thus complicated configuration it may be desirable to provide in the tank a plurality of fuel delivery units, that is to say reservoirs with a fuel pump associated with each respective reservoir. In that case the catch receptacle can be provided with a plurality of discharges so that the catch receptacle can serve at the same time as a fuel-distributor element.

In a further preferred feature the filling conduit can be provided with means for limiting blowback. The means for limiting blowback may desirably include a check valve disposed in the filling conduit at the entry end.

Further objects, features and advantages of the invention will be apparent from the description hereinafter of a preferred embodiment of the invention.

DESCRIPTION OF THE PREFERRED EMBODIMENT

Figure 1:
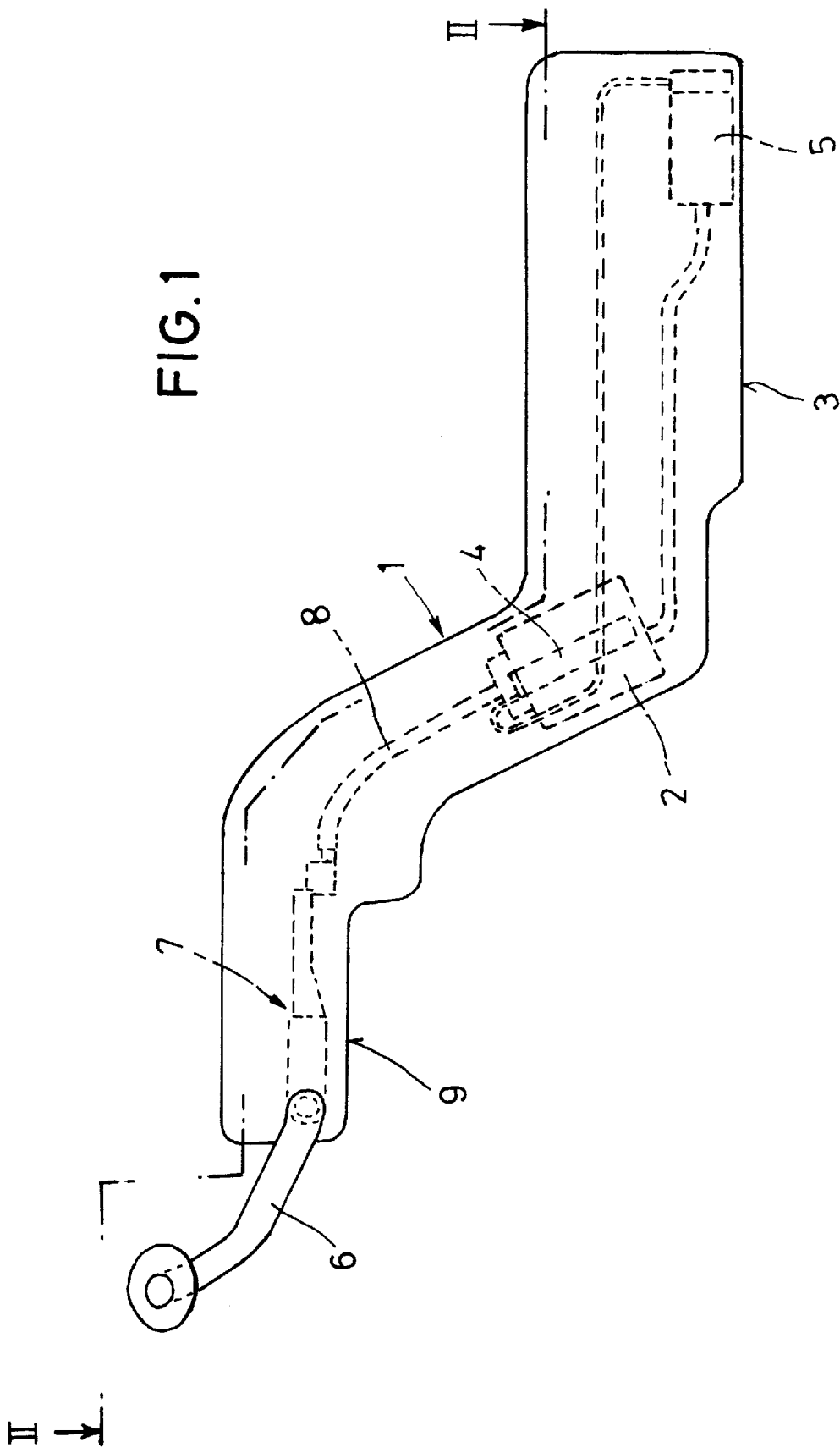
FIG. 1 is a diagrammatic side view of an embodiment of a fuel tank according to the invention, incorporating the filling arrangement.

Referring firstly to FIG. 1, shown generally therein is a fuel tank for a motor vehicle, as indicated at 1, which can be produced in various ways from suitable plastic material or metal.

The fuel tank 1 is provided with a container for containing a residual amount of fuel, often referred to as a swirl pot or surge pot, referred to herein as the reservoir 2. The reservoir 2 is of a markedly smaller volume than the tank 1 in its entirety and is suitably fixed within the tank 1 to the bottom thereof. The tank 1 thus has a main fuel tank body accommodating the main volume of fuel and the reservoir 2 which is arranged therewithin.

Disposed in the reservoir 2 is an electric fuel pump 4 for delivering the fuel from the reservoir 2 to the engine (not shown) of a motor vehicle.

In per se known manner, a partial flow of fuel is branched off the delivery flow from the fuel pump, for operating a suction jet pump 5 which in turn conveys the fuel from the main fuel tank body into the reservoir 2. The reservoir 2 can be closed off in itself except for an overflow, but it can also be open at its top.

In the embodiment illustrated in the Figures herein, the volume which is afforded by the reservoir 2 and from which the fuel pump 4 draws fuel for delivery to the motor vehicle engine is comparatively small. The fuel tank further includes a filler pipe 6 which is arranged outside the main fuel tank body and a filling conduit 7 which is connected in the fuel tank 1 directly to the filler pipe 6 and which is shown in greater detail in FIG. 3 to which reference will be made hereinafter.

As can be seen in particular from FIG. 1, the filling conduit 7, in the regular position of installation of the fuel tank 1 in a vehicle, is arranged at a level markedly above that of the reservoir 2 which is usually to be provided at a relatively low location or at the lowest location of the fuel tank 1.

In order to ensure that, in a tank-filling procedure, the reservoir 2 is filled with fuel as a priority matter, the fuel is fed to the reservoir from the fuel conduit 7 by way of a feed duct 8.

In the illustrated embodiment, the fuel tank 1 is in the form of a comparatively flat component which is of a branched and stepped configuration, affording a plurality of levels. The filling conduit 7 is in the form of a shallow conduit of rectangular cross-section, as can be clearly seen from FIG. 3, in accordance with the spatially constricted conditions in the fuel tank 1. The filling conduit 7 can for example rest on the bottom 3 of the fuel tank 1, at the uppermost level of the fuel tank 1, as indicated at 9 in FIG. 1.

Referring now again also to FIG. 3, the filling conduit 7 has an entry connection 10 which is of round cross-section and which in the position of installation is fitted into the filling pipe 6. The extent of the entry connection 10 is approximately perpendicular or at an acute angle to the main direction in which the filling conduit 7 extends, so that the fuel which flows through the filling conduit firstly experiences a change in its direction of flow.

Figure 3:
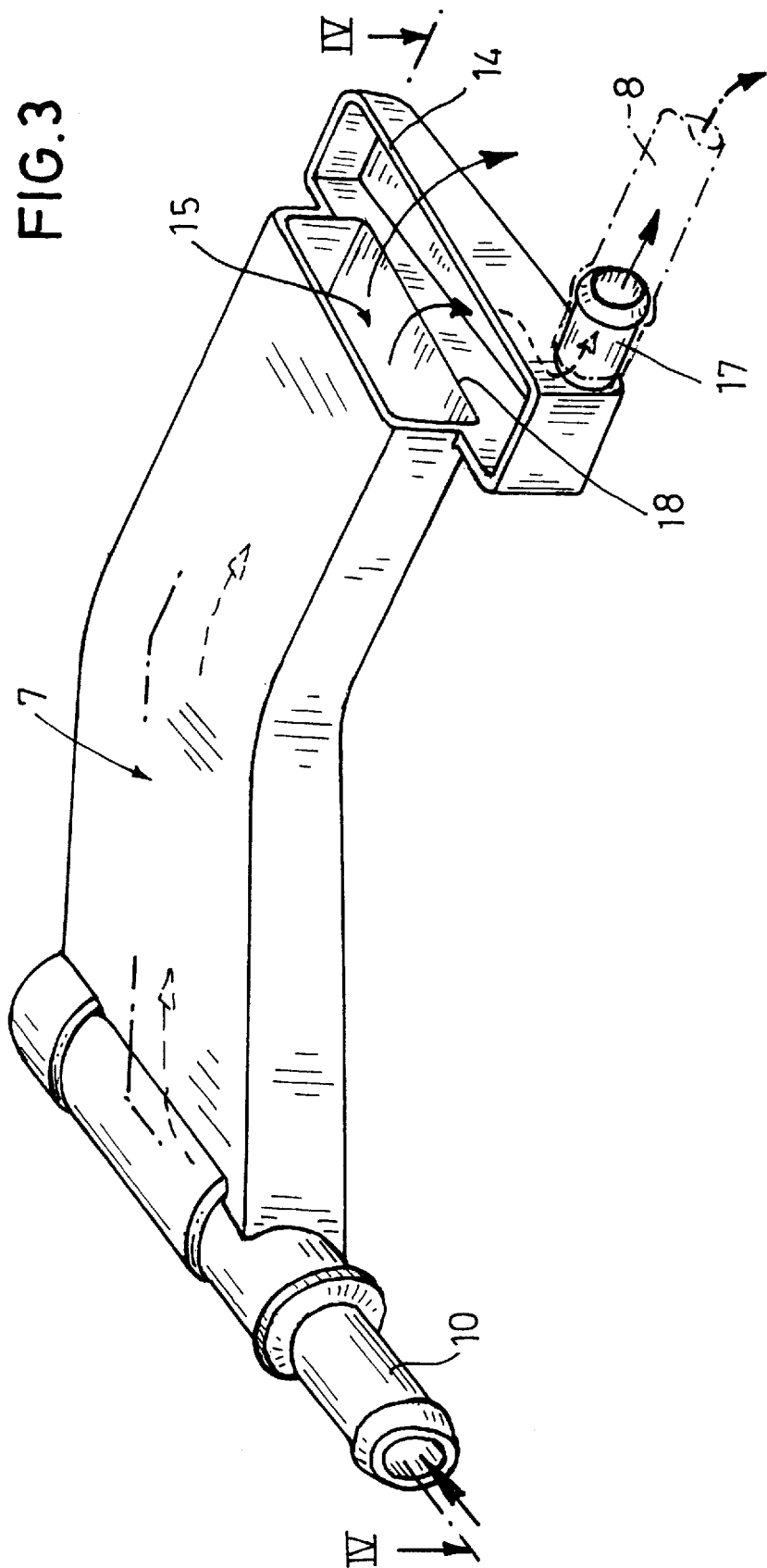
FIG. 3 is a perspective view of the filling conduit of the fuel tank of FIGS. 1 and 2.
Figure 4:
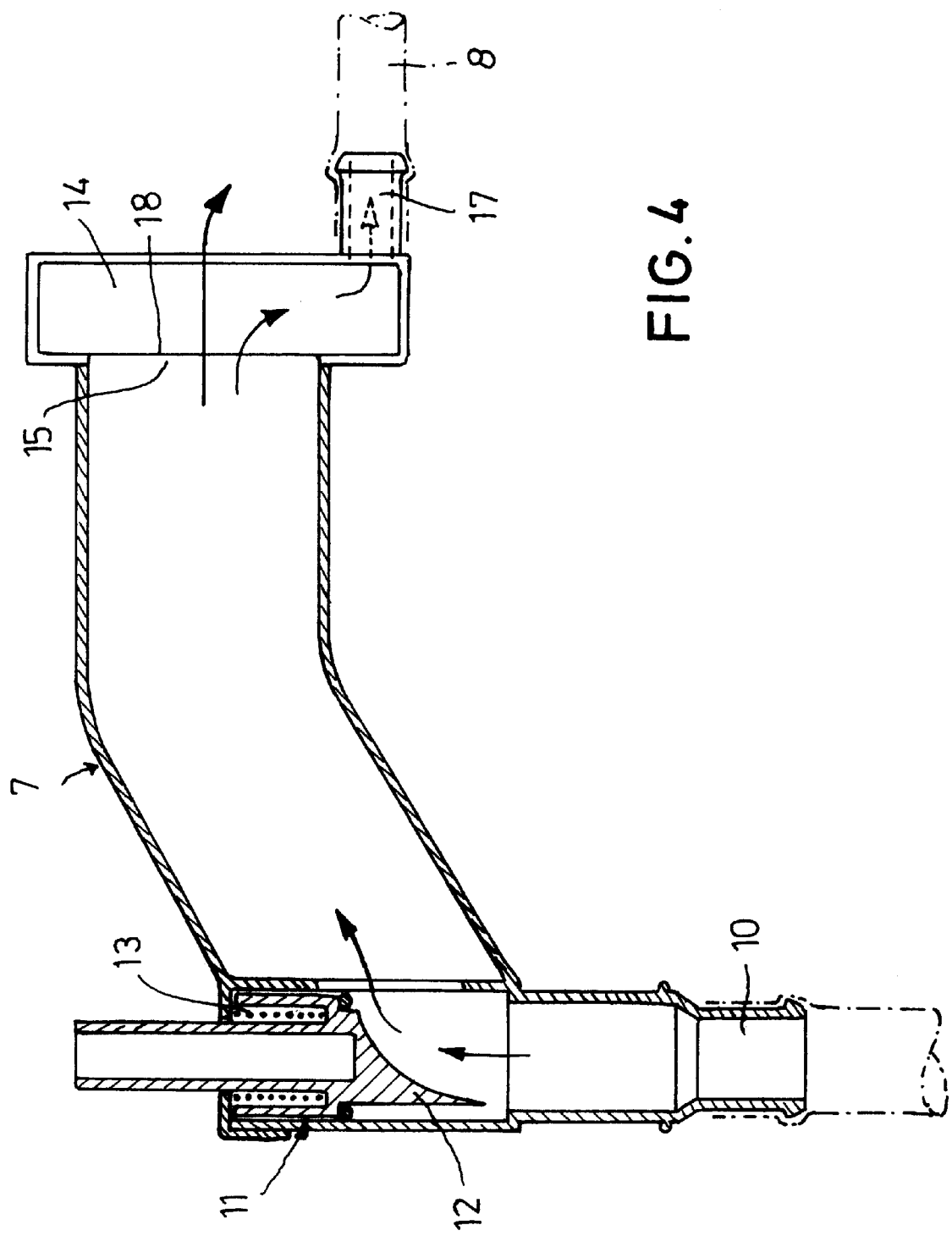
FIG. 4 is a view in section taken along line IV—IV in FIG. 3 showing a check valve of the arrangement in the open position.
Figure 5:
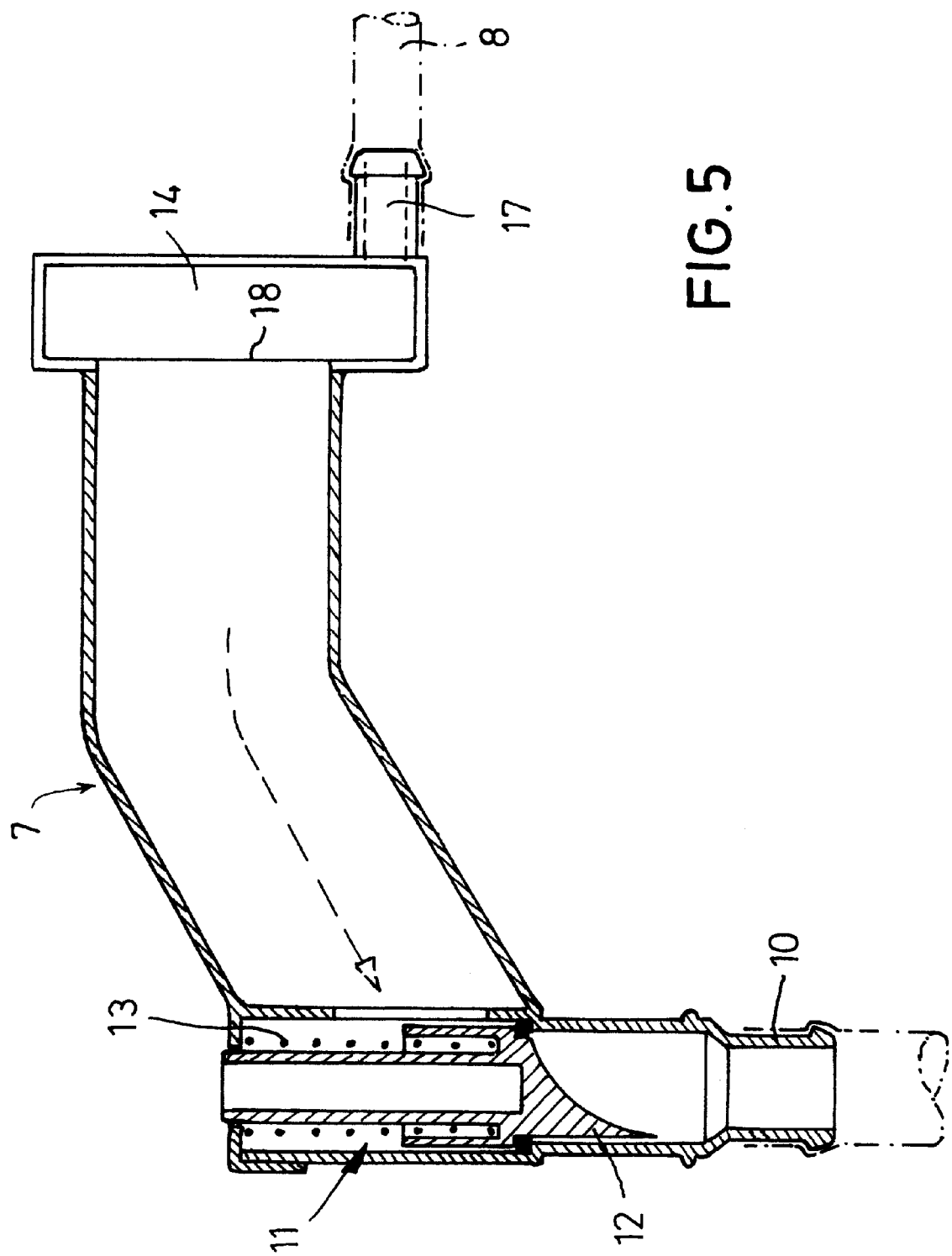
FIG. 5 is a view corresponding to FIG. 4 showing the check valve in the closed position.

Looking now also at FIGS. 4 and 5, provided in the entry connection 10 is a check valve 11 which is held under a spring loading in a closed position as shown in FIG. 3. The check valve 11 has a valve body 12 having an end face which is in the shape of a segment of a curve, in such a way that, when the check valve 11 is in the open position as shown in FIG. 4, the fuel is deflected into the rectangular cross-section of the filling conduit 7, with as little swirl and turbulence as possible.

Reference numeral 12 in FIGS. 4 and 5 denotes the spring urging the valve body 12 towards the closed position of the check valve 11.

The check valve 11 is so set that the pressure of the fuel as it flows into the entry connection 10 causes displacement of the fuel body 12 and thus causes the check valve 11 to open. The spring stiffness of the compression spring 13 holding the valve body 12 in the closed position is so selected that just very small amounts of fuel, for example when filling the tank from an emergency or reserve can, will cause the valve body 12 to be moved into the open position of the check valve 11.

Figure 2:
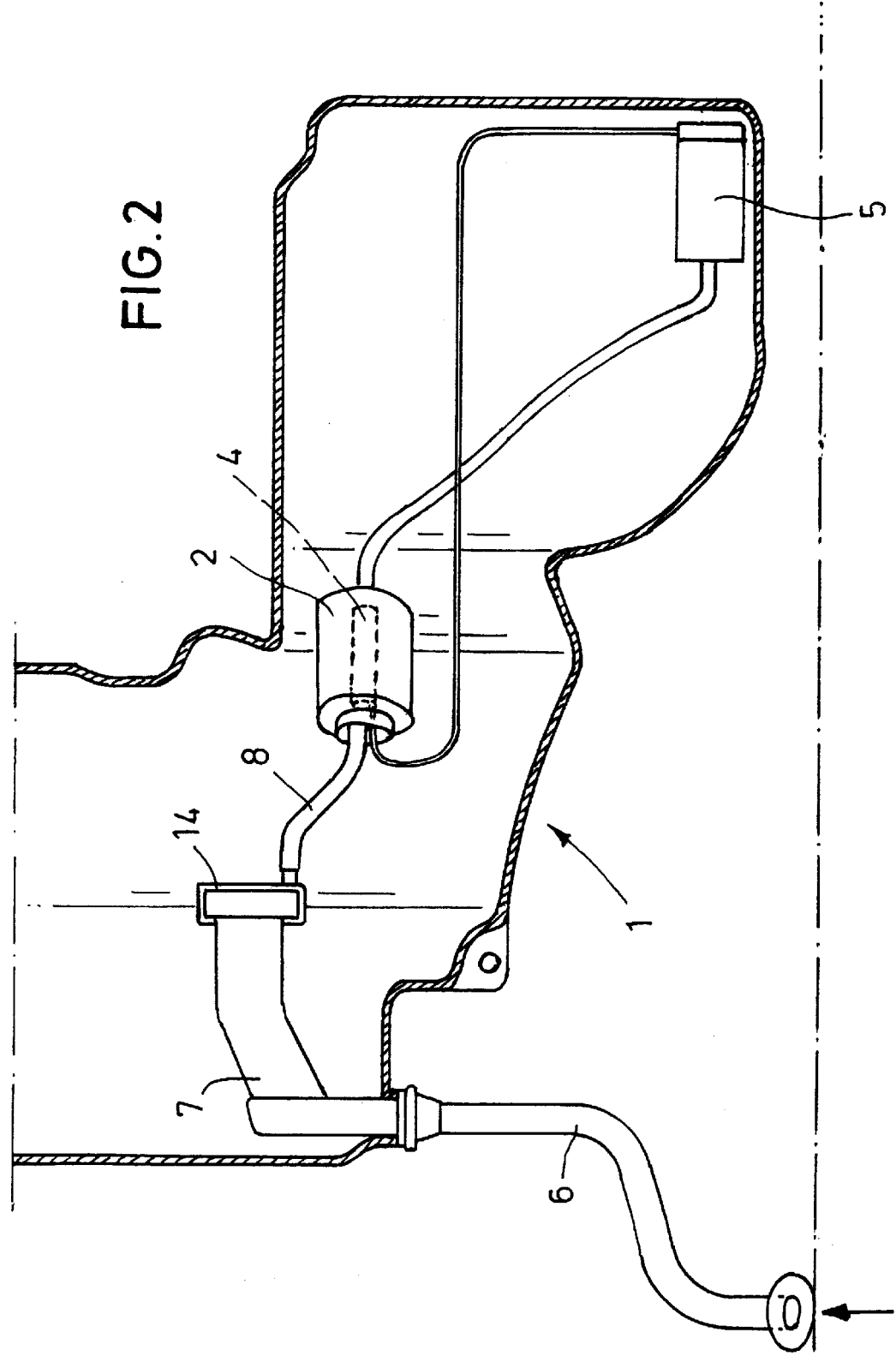
FIG. 2 is a view in section taken along line II—II in FIG. 1.

Referring once again to FIGS. 2 and 3, as well as FIGS. 4 and 5, at the delivery end of the filling conduit 7, that is to say the end which is remote from the entry connection 10, the filling arrangement of the fuel tank has a catch receptacle indicated at 14, which is in the form of an open trough or pan as illustrated but which can be in the form of a funnel-shaped receptacle. The catch receptacle 14 is formed in one piece with the filling conduit 7 and, assuming that the filling conduit 7 is in the usual position when the fuel tank is in its condition of being installed in a motor vehicle, the catch receptacle 14 extends entirely beneath the delivery opening 15 of the filling conduit 7. This configuration can be clearly seen for example from FIG. 3.

It will be seen moreover from FIG. 3 that the bottom 16 of the catch receptacle 14 has a fall towards a discharge 17 arranged at approximately the lowest point thereof.

As already mentioned above the discharge 17 communicates directly with the reservoir 2 by way of the feed line 8.

In order to ensure that, when the tank is being filled at high filling speeds, the incoming flow of fuel does not flow completely over the top of the catch receptacle 14, the catch receptacle 14 could be suitably varied for example in terms of its depth in the direction of flow of the fuel. It is also possible for example to increase the height of the wall of the catch receptacle 14, which is disposed downstream of the flow of fuel.

Finally, the entry edge of the catch receptacle 14, which is identified by 18, can be rounded off in order to promote the flow of fuel remaining clinging thereto at relatively low fuel flow speeds in that region.

As is readily apparent from the drawing, the internal cross-section of the filling conduit 7 is a multiple greater than the internal cross-section of the discharge 17 or the feed line 8 so that the catch receptacle 14 which is upwardly open also performs the function of an intermediate or buffer container.

It will be appreciated that the above-described fuel tank and fuel tank filling arrangement have been set forth solely by way of example and illustration of the principles of the invention and that various modifications and alterations may be made therein without thereby departing from the spirit and scope of the invention.

What is claimed is:

1. A fuel tank for a motor vehicle comprising a fuel tank body, at least one reservoir within the fuel tank body, at least one fuel pump operatively associated with the reservoir to draw fuel therefrom, at least one filling conduit having a fuel delivery end and so designed that at least a partial flow of fuel flowing in therethrough can be fed directly to the reservoir, and at the delivery end of the filling conduit an open catch receptacle placed to receive fuel issuing from said delivery end, the catch receptacle including at least one discharge communicating with the reservoir.

2. A fuel tank as set forth in claim 1 including a feed line connecting the discharge to the reservoir, wherein the internal cross-section of the discharge is smaller than the internal cross-section of the filling conduit.

3. A fuel tank as set forth in claim 1 wherein the discharge is connected directly to the reservoir and the internal cross-section of the -discharge is smaller than the internal cross-section of the filling duct.

4. A fuel tank as set forth in claim 1 wherein the catch receptacle is formed in one piece with the filling conduit.

5. A fuel tank as set forth in claim 1 wherein the discharge is arranged at the location of the catch receptacle which is lowest in the position of installation of the tank.

6. A fuel tank as set forth in claim 1 wherein the catch receptacle is provided with a plurality of discharges.

7. A fuel tank as set forth in claim 1 wherein the catch receptacle has a fall in the direction of the discharge.

8. A fuel tank as set forth in claim 1 wherein the filling conduit is provided with means for limiting blowback.

9. A fuel tank as set forth in claim 8 wherein the blowback limiting means include a check valve in the filling conduit at the entry end thereof.

10. A filling arrangement for a fuel tank comprising at least one reservoir which in use is arranged within the fuel tank, at least one fuel pump operatively associated with the reservoir to draw fuel therefrom, a filling conduit having a delivery end and so designed that at least a partial flow of fuel flowing therethrough can be fed directly to the reservoir, and at the delivery end of the filling conduit an upwardly open catch receptacle to receive fuel from the filling conduit and having at least one fuel discharge which communicates with the reservoir.

\* \* \* \* \*